United States Patent
Lin et al.

(10) Patent No.: US 9,258,465 B2
(45) Date of Patent: Feb. 9, 2016

(54) IMAGE DEVICE HAVING EFFICIENT HEAT TRANSFER, AND ASSOCIATED SYSTEMS

(71) Applicant: OmniVision Technologies, Inc., Santa Clara, CA (US)

(72) Inventors: Wei-Feng Lin, HsinChu (TW); Yu-Kai Huang, Cihtong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 87 days.

(21) Appl. No.: 14/151,406

(22) Filed: Jan. 9, 2014

(65) Prior Publication Data

US 2015/0195433 A1 Jul. 9, 2015

(51) Int. Cl.
*H04N 5/225* (2006.01)
*G03B 17/55* (2006.01)

(52) U.S. Cl.
CPC .............. *H04N 5/2252* (2013.01); *G03B 17/55* (2013.01); *H04N 5/2253* (2013.01); *H04N 5/2257* (2013.01); *H04N 5/2259* (2013.01)

(58) Field of Classification Search
CPC ........................... H04N 5/2259; H04N 5/2257
USPC .................... 348/340, 373, 374, 375
See application file for complete search history.

(56) References Cited

U.S. PATENT DOCUMENTS

2013/0342691 A1* 12/2013 Lewis et al. .................... 348/143
2015/0070557 A1* 3/2015 Petty et al. ............... 348/333.01

* cited by examiner

*Primary Examiner* — Tuan Ho
(74) *Attorney, Agent, or Firm* — Lathrop & Gage LLP

(57) ABSTRACT

An imaging device provides efficient heat transfer by orienting components of the imaging device such that heat is transferred out of the imaging device instead of within the imaging device assembly. Heat is transferred out of the imaging device assembly through a printed circuit board to which the assembly housing is mounted thereon and/or through the housing itself.

13 Claims, 5 Drawing Sheets

IMAGE DEVICE HAVING EFFICIENT HEAT TRANSFER, AND ASSOCIATED SYSTEMS

BACKGROUND

This invention relates to imaging sensor modules, and specifically heat transfer systems and methods for image sensor modules having multiple high power devices.

Imaging systems are becoming increasingly advanced. These systems are utilized in a wider variety of applications than ever before. For example, imaging systems are being used within automobiles, smart phones, stand-alone cameras, and numerous other applications. The advance in imaging system technology is resulting in modules requiring vastly more power and generating vast amounts of image data.

FIG. 1 illustrates a prior art imaging module 100. Imaging module 100 includes a housing 102, at least one lens 104, and a stacked configuration of an image sensor 106, a memory device 108, and an application circuit 110. Each of memory device 108 and application circuit 110 is illustrated with a metal heat sink 112 located on top of the element. Each of image sensor 106, memory device 108, and application circuit 110 are coupled to a respective printed circuit board 114, wherein printed circuit boards 114 are coupled to each other via connectors 116.

As illustrated in FIG. 1, heat generated from any of image sensor 106, memory device 108, and/or application circuit 110 is dissipated directly within housing 102 (i.e. into the module 100 assembly). This heat concentrates within housing 102 and causes substantial reduction in performance of the imaging module 100.

There exists a need to reduce the amount of heat within the imaging module assembly, thereby substantially increasing the performance of the imaging module.

SUMMARY OF THE INVENTION

An imaging device having efficient heat transfer includes a housing forming a space therewithin; an image sensor, located within the space and oriented in a first orientation, for generating image data from light imaged thereon by one or more lenses; a memory device, located within the space, for storing the image data; and, an imaging circuit, located within the space, for manipulating the image data, the imaging circuit oriented in a second orientation, the second orientation opposing the first orientation such that heat is transferred outside of the space and not concentrated within the imaging device assembly.

DETAILED DESCRIPTION OF THE EMBODIMENTS

The description below details a new invention for greatly reducing the amount of heat within an imaging module, more specifically, reducing heat within an imaging module having a plurality of high power devices.

Figure 2:
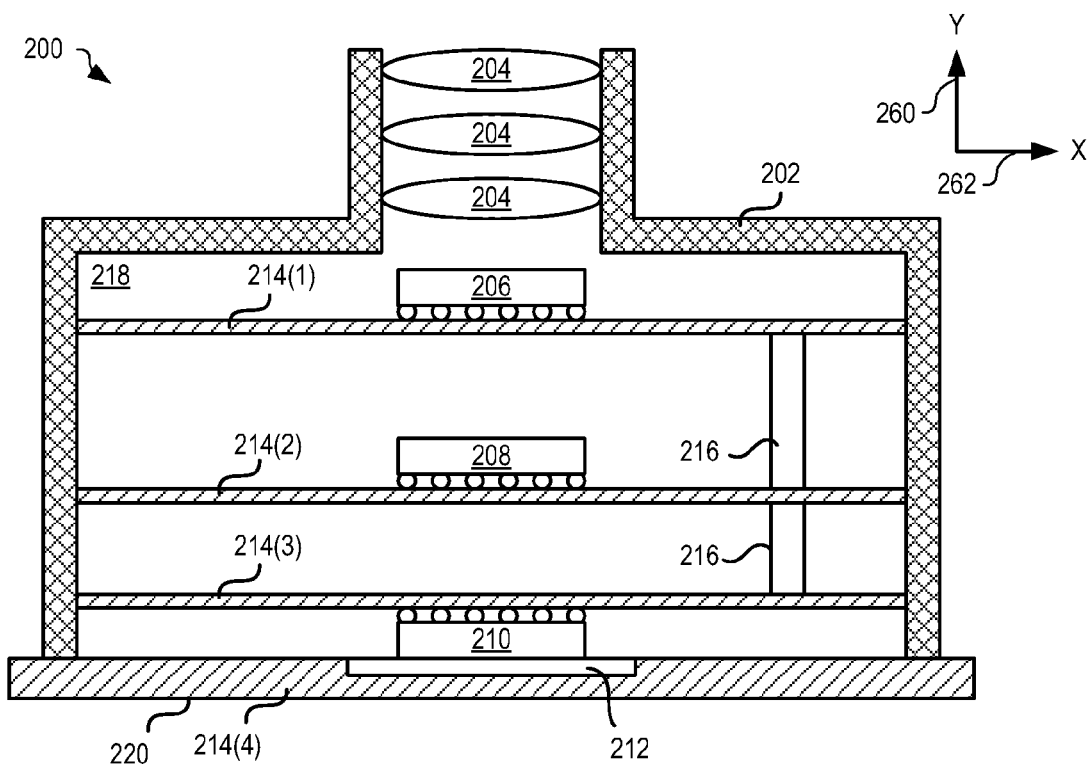
FIG. 2 depicts an exemplary imaging module having a plurality of high power devices and utilizing efficient heat transfer, in one embodiment.

FIG. 2 depicts an exemplary imaging module 200 having a plurality of high power devices and utilizing efficient heat transfer, in one embodiment. Imaging module 200 includes a housing 202, at least one imaging lens 204, an image sensor 206, a memory device 208, and an imaging circuit 210. Image sensor 206, memory device 208, and imaging circuit 210 are all in stacked configuration, on a respective printed circuit board (PCB) 214, to reduce the space required within housing 202, thereby enabling a more compact imaging module. Each PCB 214 may be connected to one or more other PCBs 214 via connectors 216.

Housing 202 protects the inner components, located within space 218 of imaging module 200, from the elements. Housing 202 is illustrated as not completely surrounding PCB 214(4). Accordingly, imaging module 200 may be attached directly to any external PCB (i.e. an OEM directly buys imaging module 200 and attaches imaging module 200 to its own PCB 214), forming space 218 there within. Space 218 is defined by the inner surface of housing 202 as well as the upper (or inner) surface of PCB 214(4). However, it would be appreciated by those skilled in the art that housing may completely surround components of imaging module 202, individually forming a sealed area 218 there within (discussed below with reference to FIG. 8).

Image sensor 206 may be a charge-coupled device (CCD), complementary metal-oxide-semiconductor device (CMOS), or any other type of sensor for generating image data. Image sensor 206 generates image data from light imaged thereon by one or more lenses 204. It will be appreciated that, although FIG. 2 illustrates three lenses 204, the present invention is not limited in scope. There may be more or fewer lenses 204 without departing from the scope hereof.

Memory device 208 may be a non-transitory memory such as a RAM, DRAM, semi-conductor memory or any other memory device known in the art. Memory device 208 is illustrated has not including a heat sink on top thereof. However, it will be appreciated that memory device 208 may include a heat sink to dissipate heat therefrom.

Figure 1:
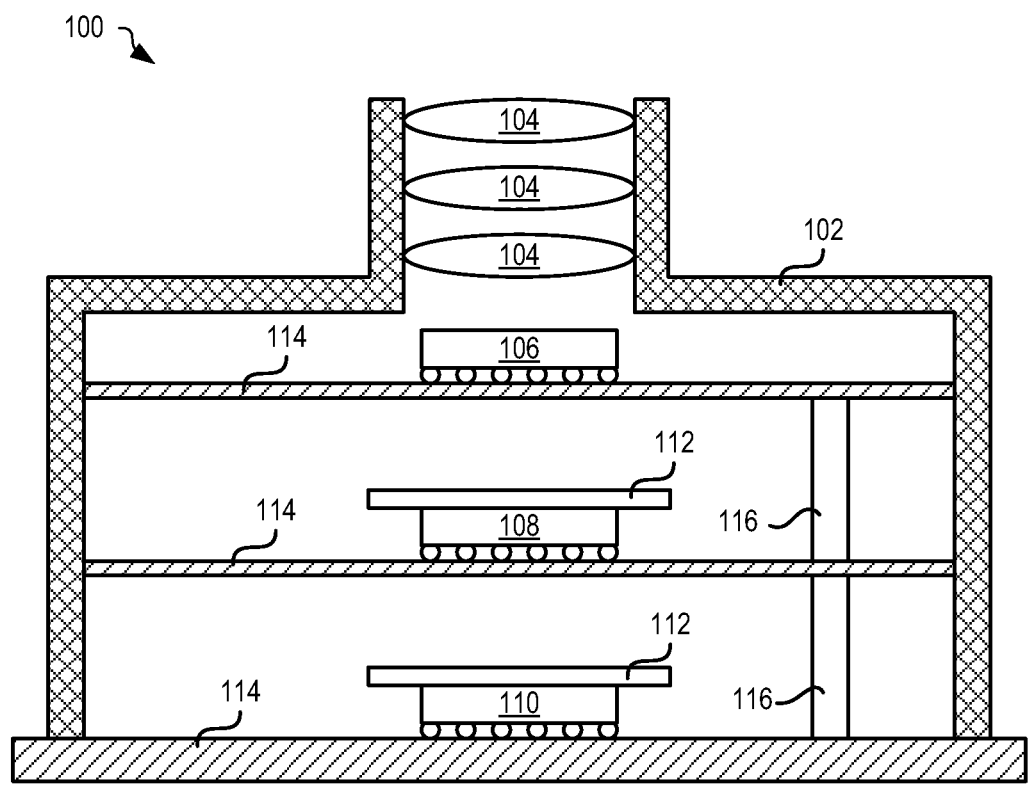
FIG. 1 illustrates a prior art imaging module with inefficient heat transfer.

Imaging circuit 210 is for example a flip chip application specific integrated circuit (ASIC). As illustrated in FIG. 1, PCB 214(4) includes a heat sink 212 embedded directly within the PCB. Heat sink 212 is disposed onto with the packaging of imaging circuit 210. Accordingly, a substantial amount of heat is not transferred from imaging circuit 210 into space 218 within housing 202. To the contrary, heat is transferred through PCB 214(4), via heat sink 212, and out the bottom surface 220 of PCB 214(4). In other words, heat is dispersed away from housing and not concentrated within housing, thereby potentially increasing performance of imaging module 200 and reducing the likelihood of heat-induced failure.

Imaging circuit 210 is in an opposing orientation from imaging sensor 206 and memory device 208. In other words, imaging sensor 206 is mounted on a top surface of PCB 214(1); memory device 208 is mounted on a top surface of PCB 214(2), and imaging circuit 210 is mounted on a bottom surface of PCB 214(3). It is noted that "top" and "bottom" are referred to within FIG. 2 with respect to y-axis 260; any horizontal variations in orientation refer to the x-axis 262 within FIG. 3. Accordingly, heat from imaging circuit 210 is transferred out of imaging module 200.

Figure 3:
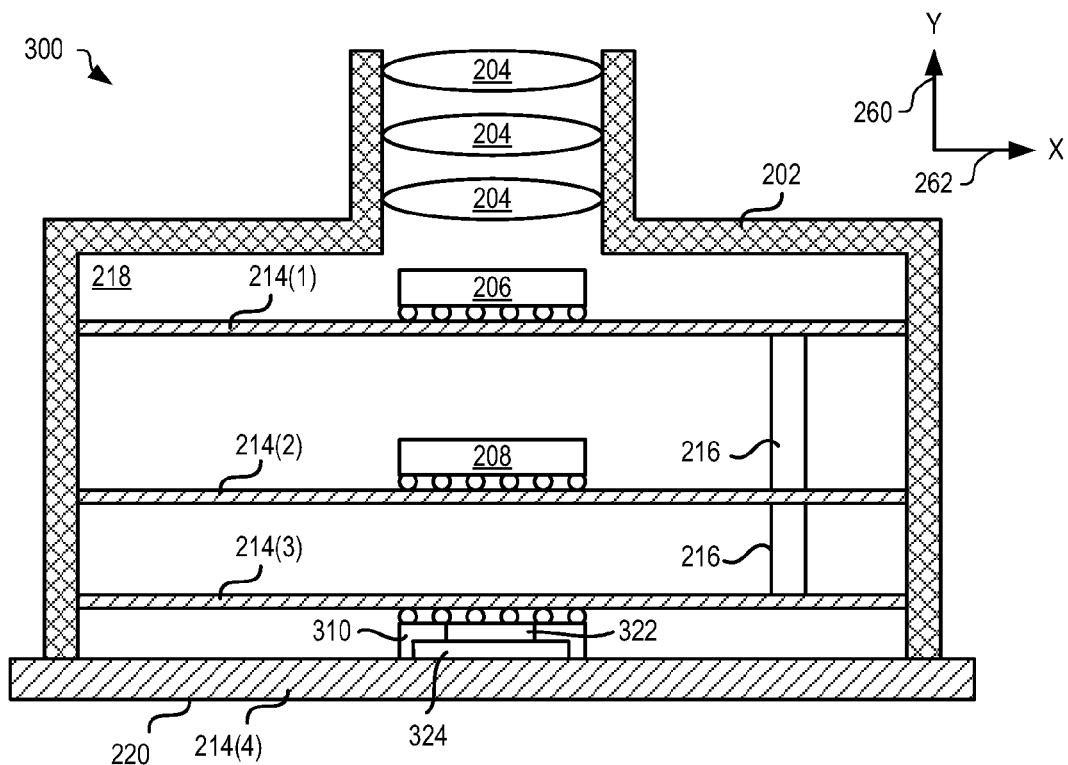
FIG. 3 depicts an imaging module having efficient heat transfer, in an alternate embodiment.

FIG. 3 depicts an imaging module 300 having efficient heat transfer, in an alternate embodiment. Imaging module 300 is similar to imaging module 200 in every aspect except the imaging circuit. Instead, imaging module 300 includes an imaging circuit 310. Imaging circuit 310 includes an imaging circuit chip 322 in a flip chip configuration. An imaging circuit heat sink 324 is directly integrated within the imaging circuit 310. Accordingly, imaging circuit heat sink 324 is disposed onto imaging circuit chip 322 within imaging circuit 310. The outer surface of imaging circuit heat sink 324 is makes contact with PCB 214(4), thereby providing efficient heat transfer, via imaging circuit heat sink 324, through bottom surface 220 of PCB 214(4). Contact may be made directly or via thermal adhesive, thermal grease, thermally conductive pad, or other such types of contact layer.

Imaging circuit 310 is in an opposing orientation than image sensor 206 and memory device 208. In other words, imaging sensor 206 is mounted on a top surface of PCB 214(1); memory device 208 is mounted on a top surface of PCB 214(2), and imaging circuit 310 is mounted on a bottom surface of PCB 214(3). It is noted that "top" and "bottom" are referred to within FIG. 3 with respect to y-axis 260; any horizontal variations in orientation refer to the x-axis 262 within FIG. 3. Accordingly, heat from imaging circuit 310 is transferred out of imaging module 300.

Figure 4:
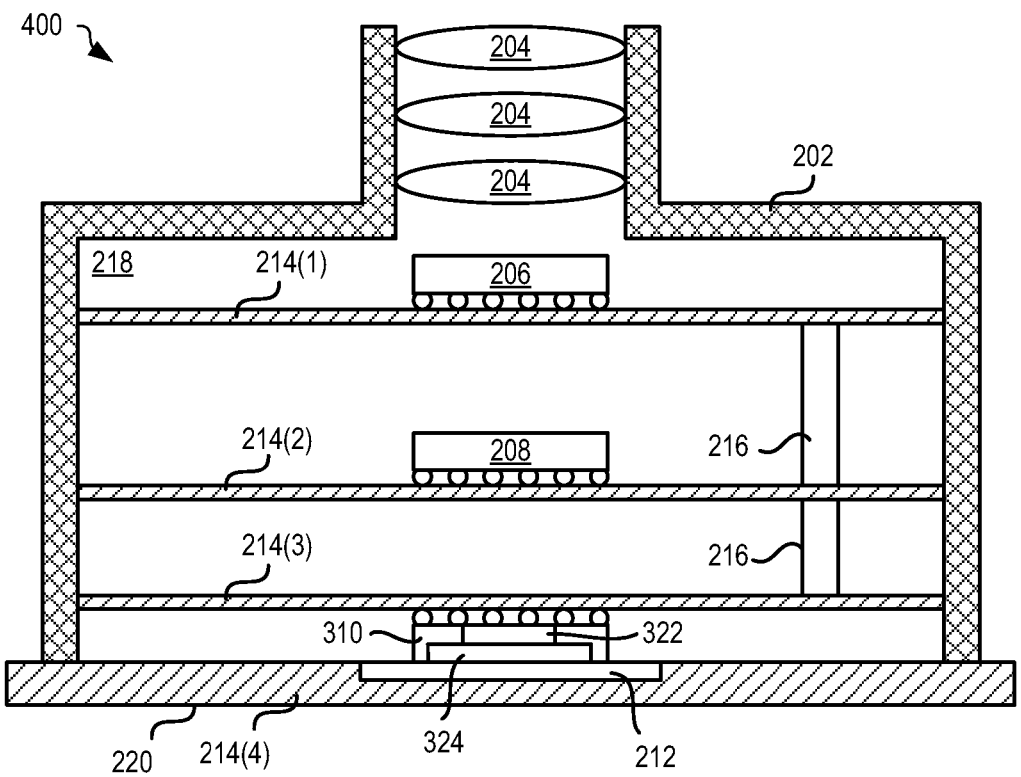
FIG. 4 depicts an imaging module having efficient heat transfer, in an alternate embodiment.

FIG. 4 depicts an imaging module 400 having efficient heat transfer, in an alternate embodiment. FIG. 4 depicts a combination of imaging module 300 and imaging module 200. Accordingly, imaging module 400 includes housing 202, at least one lens 204, image sensor 206, memory device 208, imaging circuit 310, heat sink 212, PCBs 214(1)-214(4), and connectors 216. Within imaging module 400, heat is transferred directly from imaging circuit chip 322 to PCB 214(4) via heat sink 324 and heat sink 212. This configuration enables efficient heat transfer from imaging circuit chip 322 out of module 400 such that heat is not concentrated within space 218.

Imaging circuit 310 is in an opposing orientation than image sensor 206 and memory device 208. In other words, imaging sensor 206 is mounted on a top surface of PCB 214(1); memory device 208 is mounted on a top surface of PCB 214(2), and imaging circuit 310 is mounted on a bottom surface of PCB 214(3). It is noted that "top" and "bottom" are referred to within FIG. 4 with respect to y-axis 260; any horizontal variations in orientation refer to the x-axis 262 within FIG. 4. Accordingly, heat from imaging circuit 310 is transferred out of imaging module 500.

Figure 5:
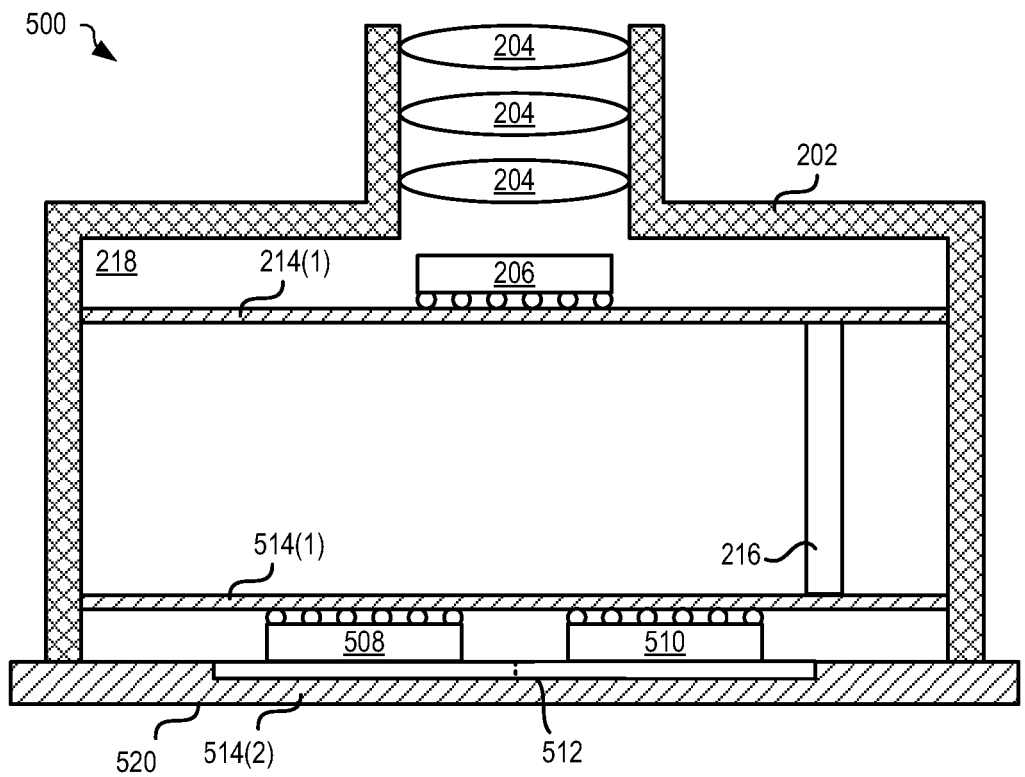
FIG. 5 depicts an imaging module having efficient heat transfer, in an alternate embodiment.

FIG. 5 depicts an imaging module 500 having efficient heat transfer, in an alternate embodiment. Imaging module 500 includes housing 202, at least one lens 204, and imaging sensor 206, similar to FIGS. 2-4, discussed above. However, imaging module 500 includes memory device 508 (similar to memory device 208) and imaging circuit 510 (similar to imaging circuits 210, 310) located on a single PCB 514(1). Each of memory device 508 and imaging circuit 510 is a flip chip device. Imaging module 500 further includes heat sink 512. Each of memory device 508 and imaging circuit 510 packaging makes contact with heat sink 512. Contact may be made directly or via a thermal adhesive, thermal grease, thermally conductive pad, or other such types of contact layer. Heat sink 512 may be a single heat sink, or may be individual heat sinks for each of memory device 508 and imaging circuit 510.

Memory device 508 and imaging circuit 510 are in an opposing orientation than image sensor 206. In other words, imaging sensor 206 is mounted on a top surface of PCB 214(1); memory device 508 is mounted on a bottom surface of PCB 514(1), and imaging circuit 510 is mounted on the bottom surface of PCB 514(1) proximate memory device 508 along x-axis 262. It is noted that "top" and "bottom" are referred to within FIG. 5 with respect to y-axis 260; any horizontal variations in orientation refer to the x-axis 262 within FIG. 5. Accordingly, heat from both memory device 508 and imaging circuit 510 is transferred out of imaging module 500.

Figure 6:
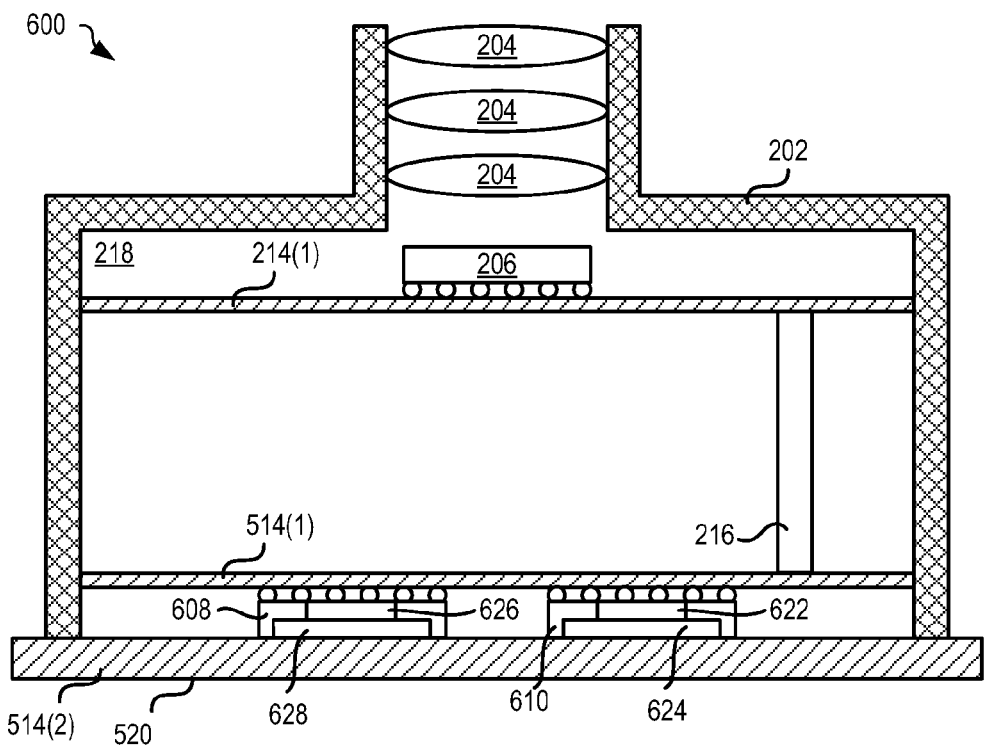
FIG. 6 depicts an imaging module having efficient heat transfer, in an alternate embodiment.

FIG. 6 depicts an imaging module 600 having efficient heat transfer, in an alternate embodiment. Imaging module 600 includes housing 202, at least one lens 204, imaging sensor 206, similar to FIGS. 2-5, above. However, imaging module 600 includes a memory device 608 including a flip chip configured chip 626 and a memory device heat sink 628 directly integrated with chip 626. The outer surface of heat sink 628 is in contact with PCB 514(2), thereby providing efficient heat transfer, via memory device heat sink 628, through bottom surface 520 of PCB 514(2).

Imaging module 600 further includes imaging circuit 610 including an imaging circuit chip 622, in a flip chip configuration, and an imaging circuit heat sink 624 directly integrated with imaging circuit chip 622. The outer surface of heat sink 628 is in contact with PCB 514(2), thereby providing efficient heat transfer, via imaging circuit heat sink 624, through bottom surface 520 of PCB 514(2).

Memory device 608 and imaging circuit 610 are in an opposing orientation than image sensor 206. In other words, imaging sensor 206 is mounted on a top surface of PCB 214(1); memory device 608 is mounted on a bottom surface of PCB 514(1), and imaging circuit 610 is mounted on the bottom surface of PCB 514(1) proximate memory device 608 along x-axis 262. It is noted that "top" and "bottom" are referred to within FIG. 6 with respect to y-axis 260; any horizontal variations in orientation refer to the x-axis 262 within FIG. 6. Accordingly, heat from both memory device 608 and imaging circuit 610 is transferred out of imaging module 600.

Figure 7:
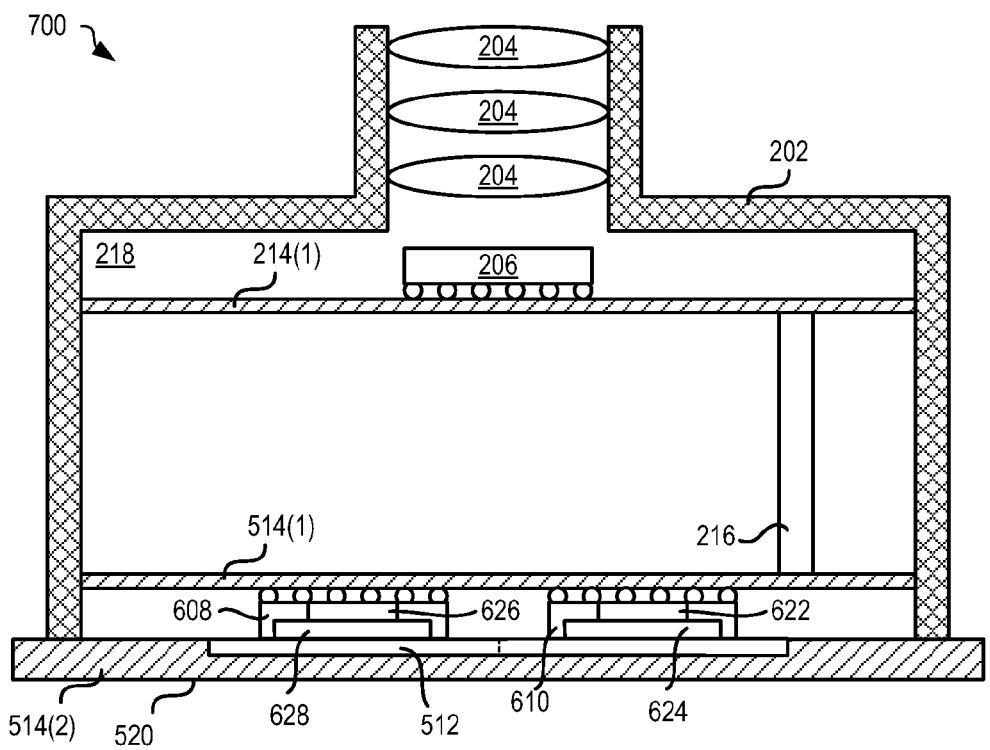
FIG. 7 depicts an imaging module having efficient heat transfer, in an alternate embodiment.

FIG. 7 depicts an imaging module 700 having efficient heat transfer, in an alternate embodiment. FIG. 7 depicts a combination of imaging module 500 and imaging module 600. Accordingly, imaging module 700 includes housing 202, at least one lens 204, image sensor 206, memory device 608, imaging circuit 610, heat sink 512, PCBs 214(1) and 514(2), and connectors 216. Within imaging module 700, heat is transferred directly from imaging circuit chip 622, directly through imaging circuit heat sink 624, directly through heat sink 512, and directly through PCB 514(2) out of bottom surface 520. Additionally within imaging module 700, heat is transferred directly from memory device chip 626, directly through memory device heat sink 628, directly through heat sink 612, and directly through PCB 514(2) out of bottom surface 520. This configuration enables efficient heat transfer from imaging circuit chip 622 and memory device chip 626 out of module 700 such that heat is not concentrated within space 218.

Memory device 608 and imaging circuit 610 are in an opposing orientation than image sensor 206. In other words, imaging sensor 206 is mounted on a top surface of PCB 214(1); memory device 608 is mounted on a bottom surface of PCB 514(1), and imaging circuit 610 is mounted on the bottom surface of PCB 514(1) proximate memory device 608 along x-axis 262. It is noted that "top" and "bottom" are referred to within FIG. 7 with respect to y-axis 260; any horizontal variations in orientation refer to the x-axis 262 within FIG. 7. Accordingly, heat from both memory device 608 and imaging circuit 610 is transferred out of imaging module 700.

Figure 8:
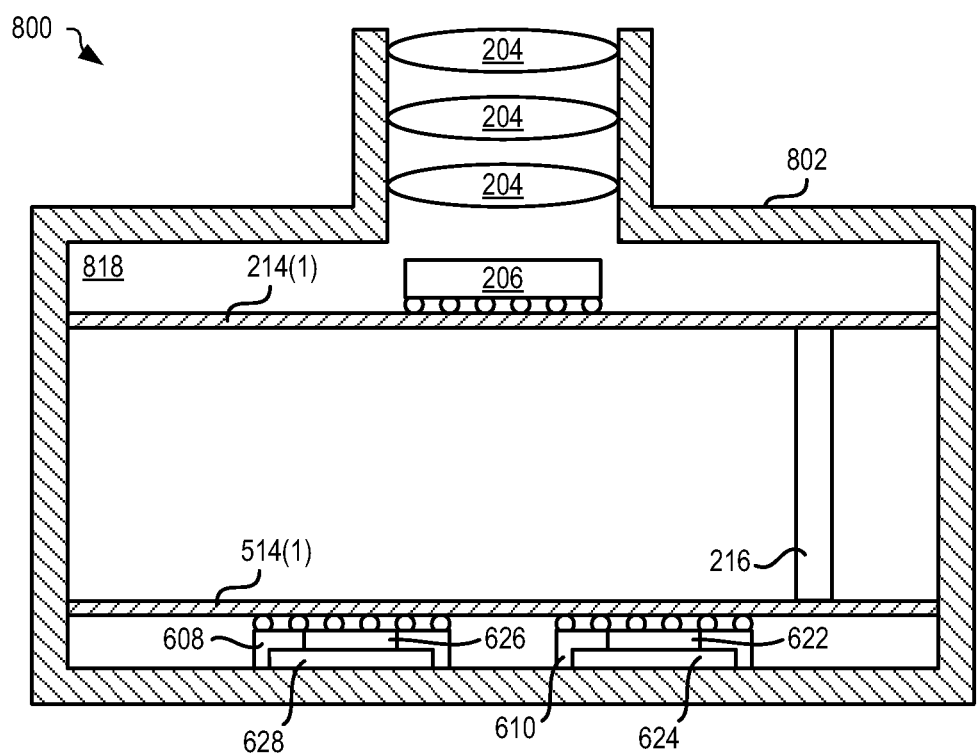
FIG. 8 depicts an imaging module having efficient heat transfer, in an alternate embodiment.

FIG. 8 depicts an imaging module 800 having efficient heat transfer, in an alternate embodiment. As discussed above, housing 202 may completely surround components Imaging module 800 includes housing 802, at least one lens 204, image sensor 206, memory device 608, and imaging circuit 610. Housing 802 completely surrounds all inner components of imaging module 800 within space 818. Space 818 is defined by the inner surface of housing 802. Electrical connections, although not shown within FIG. 8, may enable external connection to one or more of the inner components (i.e. 206, 214, 216, 608, 610) of imaging module 800.

Imaging circuit 608 contacts housing 802 thereby allowing housing 802 to act as a heat sink. In other words, imaging sensor 206 is mounted on a top surface of PCB 214(1); memory device 608 is mounted on a bottom surface of PCB 514(1), and imaging circuit 610 is mounted on the bottom surface of PCB 514(1) proximate memory device 608 along x-axis 262. It is noted that "top" and "bottom" are referred to within FIG. 8 with respect to y-axis 260; any horizontal variations in orientation refer to the x-axis 262 within FIG. 8. In other words, within imaging module 800, heat is transferred directly from memory device chip 626, directly through memory device heat sink 628, directly through housing 802.

Additionally, imaging circuit 610 makes contact with housing 802 thereby allowing housing 802 to act as a heat sink. In other words, within imaging module 800, heat is transferred directly from imaging circuit chip 622, directly through imaging circuit heat sink 624, directly through housing 802.

Memory device 608 and imaging circuit 610 are in an opposing orientation than image sensor 206. Accordingly, heat from both memory device 608 and imaging circuit 610 is transferred out of imaging module 800 and not into space 818.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An imaging device having efficient heat transfer, the imaging device comprising:
   a housing forming a space therewithin;
   an image sensor, located within the space and oriented in a first orientation, for generating image data from light imaged thereon by one or more lenses;
   a memory device, located within the space, for storing the image data; and,
   an imaging circuit, located within the space, for manipulating the image data, the imaging circuit oriented in a second orientation, the second orientation opposing the first orientation such that heat is transferred outside of the space;
   wherein:
   the imaging circuit contacts an imaging circuit heat sink embedded within the printed circuit board to which the housing is mounted thereon;
   the imaging circuit is a flip chip imaging circuit having an imaging circuit chip and an imaging circuit heat sink coupled thereto, and
   the imaging circuit heat sink contacts the printed circuit board to which the housing is mounted thereon.

2. The imaging device of claim 1, wherein the imaging circuit heat sink contacts a printed circuit board heat sink embedded within the printed circuit board to which the housing is mounted thereon.

3. The imaging device of claim 1, wherein:
   the memory device is oriented in the second orientation,
   the memory device and the imaging circuit contact a heat sink embedded within the printed circuit board to which the housing is mounted thereon.

4. The imaging device of claim 3, wherein each of the memory device and the imaging circuit contact a separate heat sink embedded within the printed circuit board to which the housing is mounted thereon.

5. The imaging device of claim 1, wherein:
   the memory device is oriented in the second orientation,
   the memory device is a flip chip memory device having a memory device chip and a memory device heat sink coupled thereto, and
   the memory device heat sink and the imaging circuit heat sink contact the printed circuit board to which the housing is mounted thereon.

6. The imaging device of claim 5, wherein the memory device heat sink and the imaging circuit heat sink contact a printed circuit board heat sink embedded within the printed circuit board to which the housing is mounted thereon.

7. The imaging device of claim 6, the printed circuit board heat sink comprising a plurality of printed circuit board heat sinks; wherein the memory device heat sink and the imaging circuit heat sink contact a separate one of the plurality of printed circuit board heat sinks embedded within the printed circuit board to which the housing is mounted thereon.

8. The imaging device of claim 1, wherein the space is defined completely by an inner surface of the housing.

9. An imaging in device having efficient heat transfer, the imaging device comprising:
   a housing forming a space therewithin, the space defined completely by an inner surface of the housing;
   an image sensor, located within the space and oriented in a first orientation, for generating image data from light imaged thereon by one or more lenses;
   a memory device, located within the space, for storing the image data; and,
   an imaging circuit, located within the space, for manipulating the image data, the imaging circuit oriented in a second orientation, the second orientation opposing the first orientation such that heat is transferred outside of the space;
   wherein:
   the memory device is oriented in the second orientation,
   the memory device and the imaging circuit contact a heat sink embedded along the inner surface of the housing.

10. The imaging device of claim 9, wherein each of the memory device and the imaging circuit contact a separate heat sink embedded along the inner surface of the housing.

11. The imaging device of claim 8, wherein:
   the memory device is oriented in the second orientation,
   the memory device is a flip chip memory device having a memory device chip and a memory device heat sink coupled thereto, and
   the memory device heat sink and the imaging circuit heat sink contact the inner surface of the housing.

12. The imaging device of claim 11, wherein the memory device heat sink and the imaging circuit heat sink contact a heat sink embedded along the inner surface of the housing.

13. The imaging device of claim 12, wherein the memory device heat sink and the imaging circuit heat sink contact separate heat sinks embedded along the inner surface of the housing.

* * * * *